(12) United States Patent
Chandrasekaran

(10) Patent No.: US 9,553,833 B2
(45) Date of Patent: Jan. 24, 2017

(54) CONFIDENTIAL MESSAGES IN A GROUP CHAT

(71) Applicant: Verizon Patent and Licensing Inc., Basking Ridge, NJ (US)

(72) Inventor: Arthanari Chandrasekaran, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/099,557

(22) Filed: Dec. 6, 2013

(65) Prior Publication Data
US 2015/0163182 A1    Jun. 11, 2015

(51) Int. Cl.
*G06F 15/16* (2006.01)
*H04L 12/58* (2006.01)
*H04L 29/06* (2006.01)

(52) U.S. Cl.
CPC ........... *H04L 51/063* (2013.01); *H04L 51/046* (2013.01); *H04L 63/0227* (2013.01); *H04L 63/104* (2013.01)

(58) Field of Classification Search
CPC .. H04L 51/04; H04L 2209/601; H04L 12/581; H04L 12/583; H04L 63/0428
USPC ........................................................ 709/204
See application file for complete search history.

(56) References Cited

U.S. PATENT DOCUMENTS

| | | | |
|---|---|---|---|
| 2002/0077178 A1* | 6/2002 | Oberberger et al. ........... | 463/42 |
| 2005/0246512 A1* | 11/2005 | Inoue ........................... | 711/164 |
| 2006/0117264 A1* | 6/2006 | Beaton et al. ................. | 715/751 |
| 2006/0126096 A1* | 6/2006 | Yasukaga et al. ........... | 358/1.14 |
| 2006/0184628 A1* | 8/2006 | Coley et al. .................. | 709/206 |
| 2007/0073839 A1* | 3/2007 | Chung et al. ................. | 709/217 |
| 2007/0088723 A1* | 4/2007 | Fish .............................. | 707/100 |
| 2007/0244700 A1* | 10/2007 | Kahn et al. ................... | 704/235 |
| 2008/0091785 A1* | 4/2008 | Pulfer et al. .................. | 709/206 |
| 2008/0152132 A1* | 6/2008 | Sung et al. ..................... | 380/44 |
| 2008/0168138 A1* | 7/2008 | Simpson ....................... | 709/204 |
| 2009/0019553 A1* | 1/2009 | Narayanaswami ............. | 726/28 |
| 2009/0262379 A1* | 10/2009 | Miyake et al. ............. | 358/1.13 |
| 2009/0284786 A1* | 11/2009 | Natori .......................... | 358/1.15 |
| 2010/0005402 A1* | 1/2010 | George et al. ................ | 715/758 |
| 2011/0258092 A1* | 10/2011 | Edwards et al. ................ | 705/30 |

(Continued)

OTHER PUBLICATIONS

Symmetric Key Algorithm (Wikipedia, Oct. 14, 2012).*

(Continued)

*Primary Examiner* — Vivek Srivastava
*Assistant Examiner* — Nicholas Celani

(57) ABSTRACT

A device is configured to receive a message associated with a group chat. The group chat may include a communication session among a set of user devices including a first user device and a second user device. The device is configured to receive an indication that the message is confidential and designate the message as a confidential messaged based on the indication. The device is configured to determine that the first user device is authorized to display the message and that the second user device is not authorized to display the message. The device is configured to provide the confidential message to the first user device for display as part of the group chat, and to provide a blocked version of the confidential message to the second user device for display as part of the group chat.

20 Claims, 12 Drawing Sheets

(56) References Cited

U.S. PATENT DOCUMENTS

2012/0213364 A1* 8/2012 Jin et al. .................. 380/255
2013/0212701 A1* 8/2013 Warrington et al. ........... 726/27

OTHER PUBLICATIONS

Wikipedia, "Chat Room", http://en.wikipedia.org/w/index.php?title=Chat_room&oldid=584252535, Dec. 2, 2013, 3 pages.
Wikipedia, "Instant Messaging", http://en.wikipedia.org/w/index.php?title=Instant_messaging&oldid=584694833, Dec. 5, 2013, 12 pages.

* cited by examiner

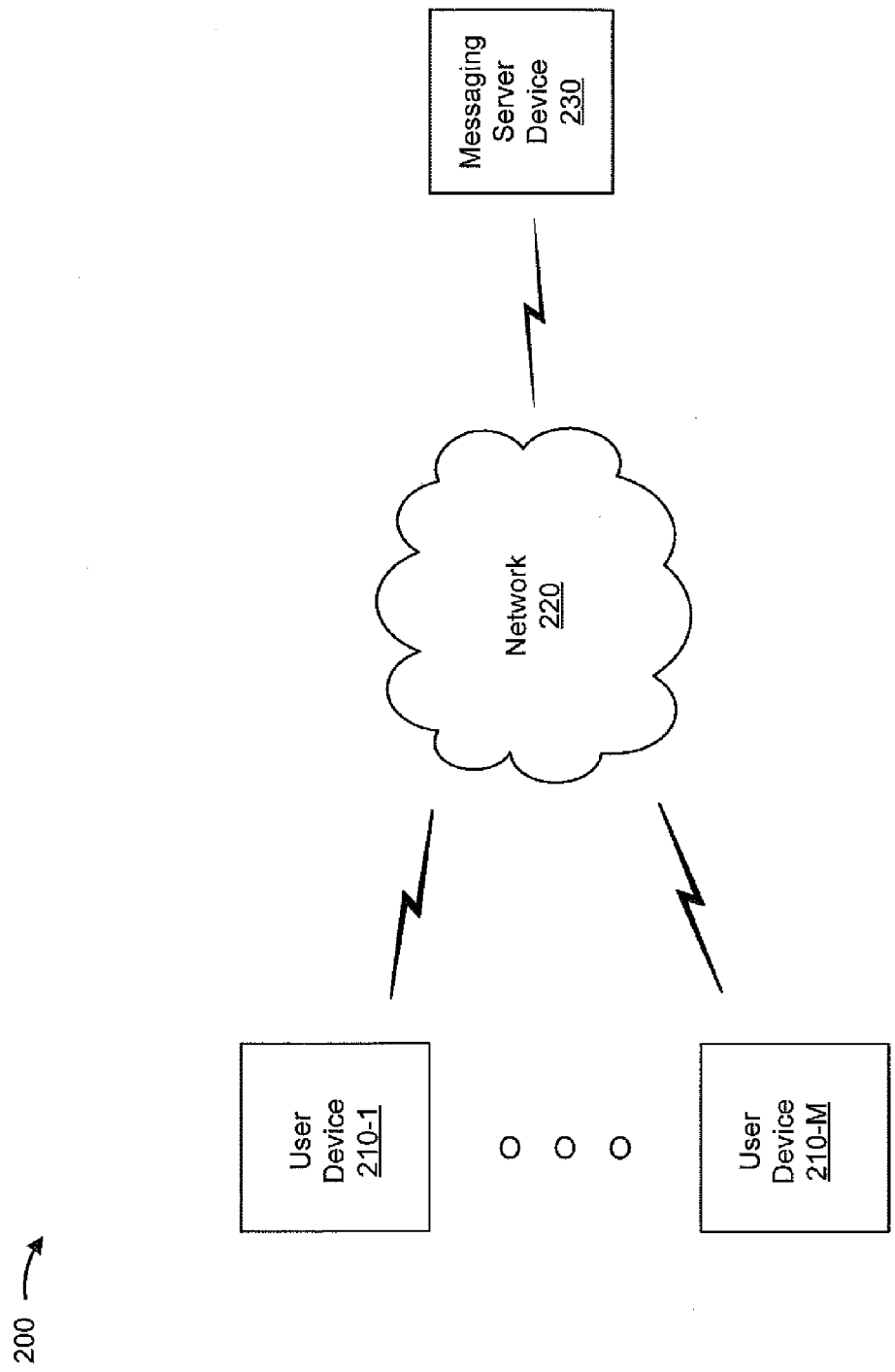

CONFIDENTIAL MESSAGES IN A GROUP CHAT

BACKGROUND

A user device (e.g., a smartphone, a desktop computer, a laptop computer, a tablet computer, etc.) may exchange messages with other user devices as part of a group chat. A message exchanged as part of the group chat may be displayed by all user devices associated with the group chat.

BRIEF DESCRIPTION OF THE DRAWINGS

FIG. 2 is a diagram of an example environment in which systems and/or methods described herein may be implemented;

DETAILED DESCRIPTION OF PREFERRED EMBODIMENTS

The following detailed description of example implementations refers to the accompanying drawings. The same reference numbers in different drawings may identify the same or similar elements.

A group of users (e.g., associated with a set of user devices) may participate in a group chat. The group chat may include a communication session, where members of the group exchange messages with other members of the group (e.g., via the set of user devices). The group chat may permit a particular message, shared by one member of the group, to be viewed by all other members of the group.

In some instances, a particular member of the group may desire to share a message with only a subset of the group of users. For example, the particular member may desire to share a message that includes sensitive information (e.g., personal information, financial information, medical information, etc.) not intended for the group as a whole. However, the message shared as part of the group chat may be viewed by all members of the group, and not only the subset of members preferred by the particular member. Additionally, establishing a communication session with the subset of members by another means (e.g., via a separate group chat, an email, a telephone call, etc.) may be inconvenient and/or impractical for the particular member and/or the subset of members. Implementations described herein may allow a participant to a group chat to share a confidential message that may be viewed by only those members of the group chat identified by the participant.

Figure 1A:
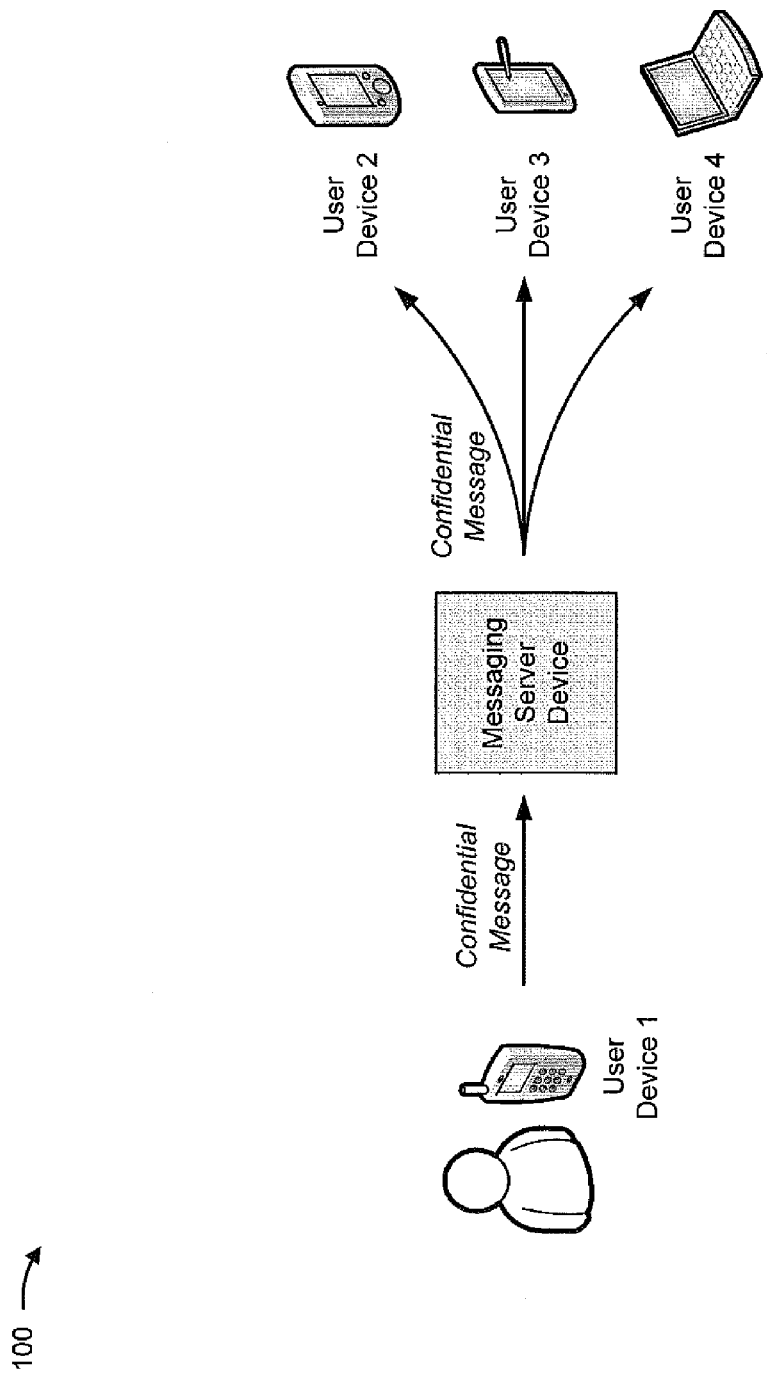
FIGS. 1A-1B are diagrams of an overview of an example implementation described herein.
Figure 1B:
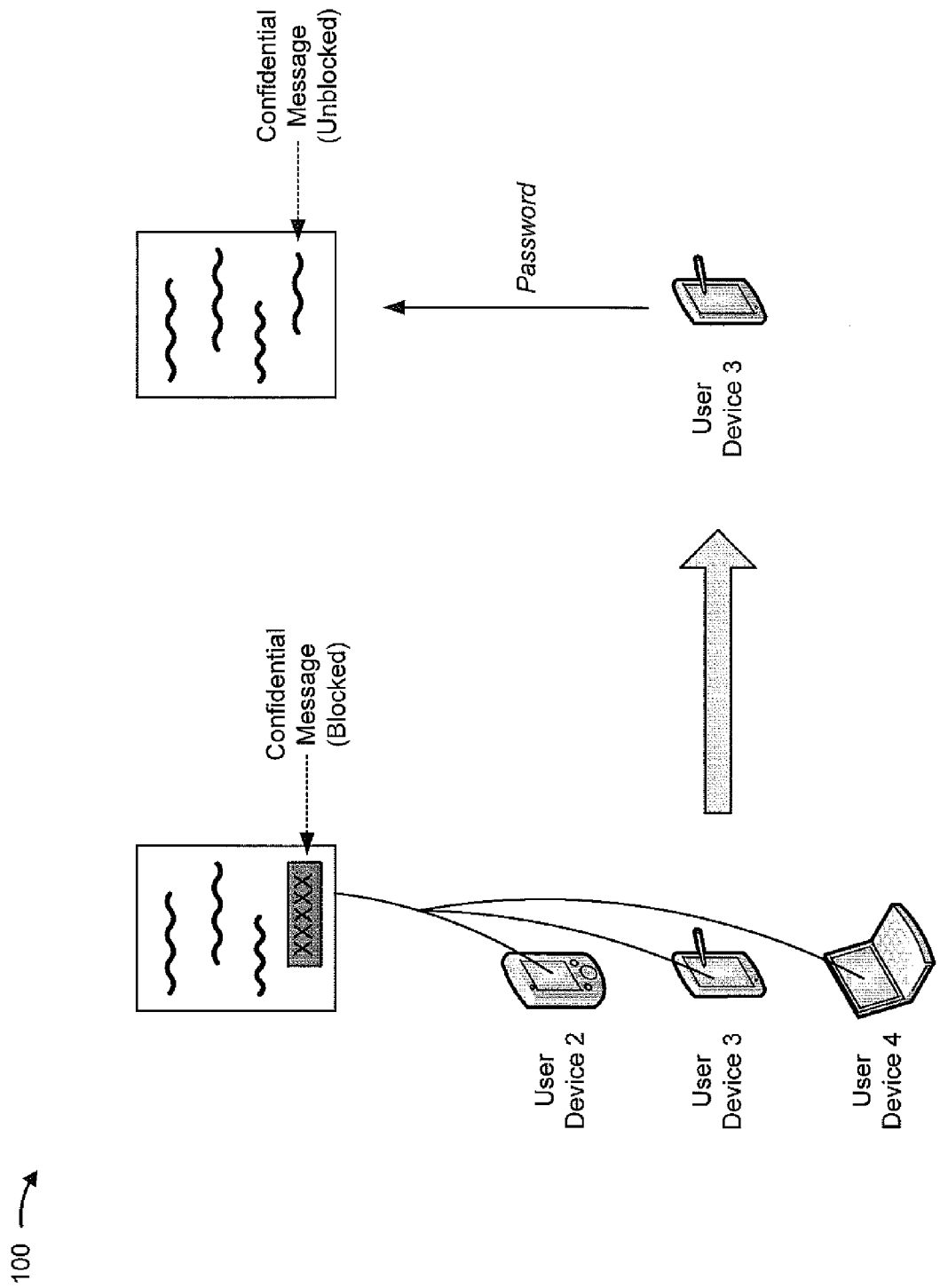

FIGS. 1A-1B are diagrams of an overview of an example implementation 100 described herein. As shown in FIGS. 1A-1B, example implementation 100 may include a group of user devices and a messaging server device. The user devices may exchange information, via the messaging server device, as part of a group chat. Assume that the group chat involves a first user device (e.g., "User Device 1"), a second user device ("User Device 2"), a third user device (e.g., "User Device 3"), and a fourth user device (e.g., "User Device 4").

As shown in FIG. 1A, the first user device may receive a message (e.g., via user input from a user of the first user device), and may receive an indication that the message is confidential. The first user device may mark the message as confidential, and may provide the confidential message to the messaging server device. The messaging server device may provide the confidential message to the second user device, the third user device, and the fourth user device associated with the group chat.

As shown in FIG. 1B, based on determining that the message is confidential, the second user device, the third user device, and the fourth user device may be unable to display the confidential message (e.g., the confidential message may be blocked). Assume that the third user device receives a password (e.g., via user input) from a user of the third user device. Based on the password, the third user device may display the confidential message (e.g., the confidential message may be unblocked). In this manner, the first user device may provide a confidential message that only a particular user device (e.g., the third user device) may display (e.g., upon receiving the password).

FIG. 2 is a diagram of an example environment 200 in which systems and/or methods described herein may be implemented. As shown in FIG. 2, environment 200 may include user devices 210-1 ... 210-M (M≥1) (hereinafter referred to collectively as "user devices 210," and individually as "user device 210"), network 220, and messaging server device 230. Devices of environment 200 may interconnect via wired connections, wireless connections, or a combination of wired and wireless connections.

User device 210 may include a device capable of generating, processing, storing, transmitting, and/or receiving a message (e.g., an instant message, an email, a short message service ("SMS") text message, etc.). For example, user device 210 may include a mobile telephone (e.g., a smartphone, a radiotelephone, etc.), a computing device (e.g., a desktop computer, a laptop computer, a tablet computer, a handheld computer, etc.), or a similar device. In some implementations, user device 210 may be associated with a telematics device. For example, user device 210 may connect (e.g., via a wired and/or wireless connection) to a telematics device associated with a vehicle, and may generate, process, store, transmit and/or receive the message via the vehicle (e.g., via a display associated with the vehicle, a user interface associated with the vehicle, etc.). Additionally, or alternatively, user device 210 may include a wearable device (e.g., a computing device that is associated with clothing and/or accessories), such as a wristband, a watch, a bracelet, glasses, etc. In some implementations, the wearable device may connect (e.g., via a wired and/or wireless connection) to another user device 205, such as a smartphone. User device 210 may receive information from and/or transmit information to messaging server device 230.

Network 220 may include one or more wired and/or wireless networks. For example, network 220 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, or a combination of these or other types of networks.

Messaging server device 230 may include one or more devices capable of receiving, storing, processing, and/or transmitting information, such as information associated with a message. For example, messaging server device 220 may include a computing device, a short message service center ("SMSC"), a multimedia message service center ("MSMC"), a server device (e.g., an instant message server, an SMS text message server, an email server, etc.), or a similar device. Messaging server device 230 may receive information from and/or transmit information to user device 210.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
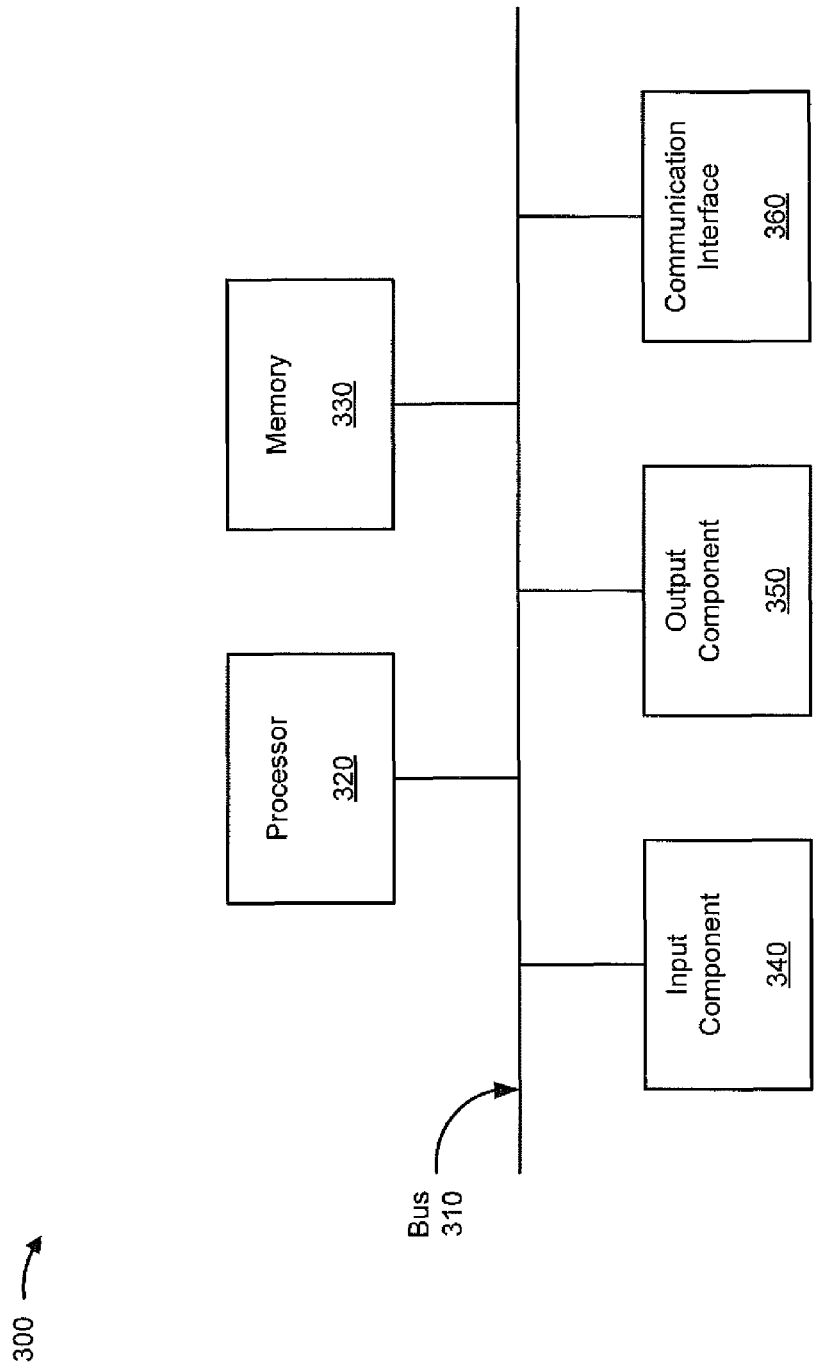
FIG. 3 is a diagram of example components of one or more devices of FIG. 2.

FIG. 3 is a diagram of example components of a device 300. Device 300 may correspond to user device 210 and/or messaging server device 230. Additionally, or alternatively, each of user device 210 and/or messaging server device 230 may include one or more devices 300 and/or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit), a microprocessor, and/or any processing component (e.g., a field-programmable gate array ("FPGA"), an application-specific integrated circuit ("ASIC"), etc.) that interprets and/or executes instructions. Memory 330 may include a random access memory ("RAM"), a read only memory ("ROM"), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes ("LEDs"), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium is defined as a non-transitory memory device. A memory device includes memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4A:
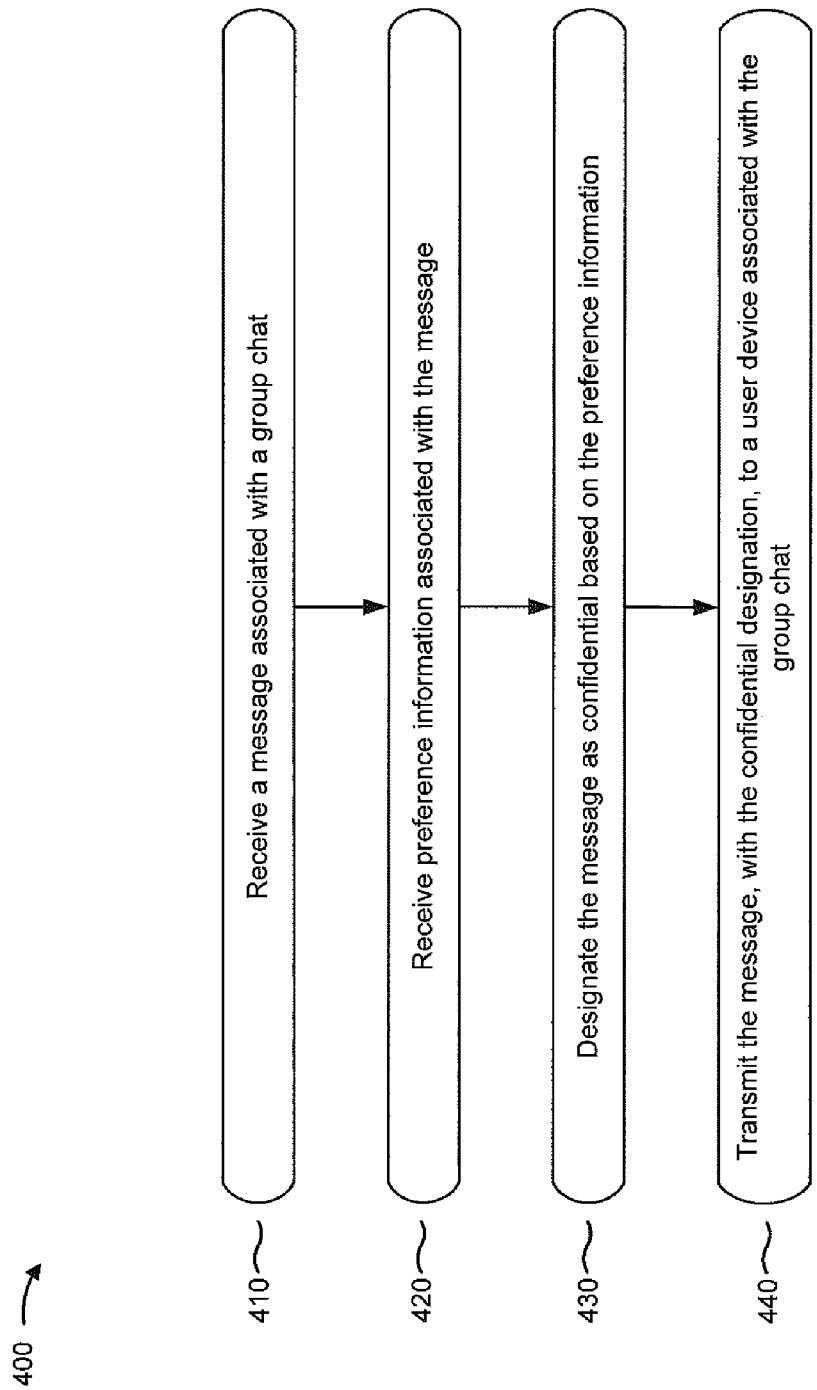
FIGS. 4A-4B are flow charts of example processes for providing and displaying a confidential message associated with a group chat.
Figure 4B:
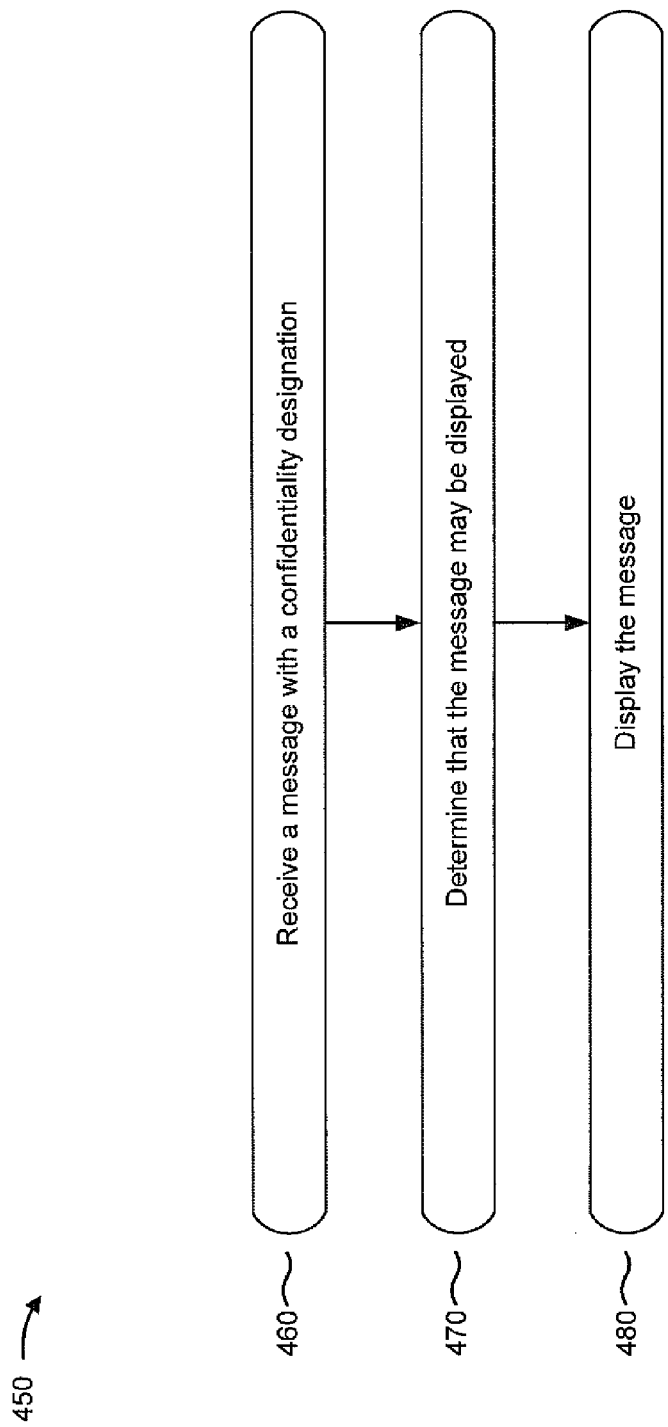

FIGS. 4A-4B are flow charts of example processes 400 and 450 for providing and displaying a confidential message associated with a group chat. In some implementations, one or more process blocks of FIGS. 4A-4B may be performed by one or more user devices 210. Additionally, or alternatively, one or more process blocks of FIGS. 4A-4B may be performed by another device or a group of devices separate from or including user device(s) 210, such as messaging server device 230.

As shown in FIG. 4A, process 400 may include generating a message associated with a group chat (block 410). For example, a first user device 210-1 may generate the message to be shared with other user devices 210 as part of the group chat.

A group chat may include a communication session (e.g., an instant messaging session, a texting session, an email session, etc.) where members of a set of user devices 210 exchange messages with other members (e.g., for all members of the set of user devices 210 to view). In some implementations, user devices 210 may display messages associated with the group chat (e.g., messages sent and/or received by the set of user devices 210) as part of a continuous roll of messages. For example, first user device 210-1 may display the messages chronologically according to times when the messages were sent and/or received. Additionally, or alternatively, user devices 210 may display information that identifies a sender of the message (e.g., that identifies which user device 210, of the set of user devices 210, sent the message). For example, first user device 210-1 may display a username, a chat name, a device identifier (e.g., a telephone number), an email address, or the like.

In some implementations, the communication session may include one or more user devices 210 that are not associated with a user. For example, one or more user devices 210 may generate and/or provide a message to other user devices 210 (e.g., of the set of user devices 210) automatically (e.g., without the aid of a user). Additionally, or alternatively, the one or more user devices 210 may generate a response to a message (e.g., received from one of the other user devices 210) automatically, and may provide the response to the other user devices 210.

In some implementations, the message may include a communication associated with user device 210. For example, the message may include a chat message, an instant message, a short message service ("SMS") text message, a multimedia messaging service ("MMS") message, an email, or the like. Additionally, or alternatively, the message may include a picture, a video, an audio recording, etc.

In some implementations, the message may be associated with supplemental information. For example, the message may be associated with a tag (e.g., a meta tag), an element (e.g., a meta element), a header, an identifier, or the like. In some implementations, the supplemental information may include a hypertext markup language ("HTML") tag, an extensible hypertext markup language (XHTML) tag, an extensible markup language ("XML") tag, an HTML element, an XHTML element, an XML element, or the like.

In some implementations, first user device 210-1 may generate the message based on user input. For example, a user of first user device 210-1 may provide user input via a user interface associated with first user device 210-1 (e.g., via a keyboard, a keypad, a touchscreen display, etc.). In some implementations, first user device 210-1 may be associated with an application (e.g., a group chat application, an instant messaging application, a texting application, an email client, a web browser, etc.), and may generate the message based on the application (e.g., based on user input received via the application). First user device 210-1 may provide the message to messaging server device 230 via the application.

As further shown in FIG. 4A, process 400 may include receiving preference information associated with the message (block 420). For example, first user device 210-1 may receive the preference information based on user input (e.g., associated with a user of first user device 210-1). Additionally, or alternatively, first user device 250-1 may receive the preference information by accessing the preference information stored in a data structure (e.g., associated with first user device 210-1).

In some implementations, the preference information may include information that identifies how the message is to be provided, received, accessed, displayed, or the like (e.g., by one or more user devices 210 of a set of user devices 210 associated with the group chat). For example, the preference information may include information that identifies that the message is to be confidential. Additionally, or alternatively, the preference information may include information that identifies which user device 210 (e.g., of the set of user devices 210 associated with the group chat) may be permitted to display the message (e.g., upon providing a password).

In some implementations, the preference information may include information that identifies which user devices 210 (e.g., of the set of user devices 210) are to receive the message. For example, the preference information may indicate that the message is to be provided to only those user devices 210 permitted to display the message. Alternatively, the preference information may indicate that the message is to be provided to all user devices 210 associated with the group chat (e.g., regardless of whether all user devices 210 are permitted to display the message).

In some implementations, the preference information may include information that identifies how the message is to be displayed on the set of user devices 210 (e.g., associated with the group chat). For example, the preference information may identify that those user devices 210 (e.g., of the set of user devices 210) that are not identified as permitted to display the message may display a blocked message (e.g., a version of the message that is blurred, obstructed, dimmed, etc.). Additionally, or alternatively, the preference information may identify that those user devices 210 that are not identified as permitted to display the message may receive a notification indicating that first user device 210-1 has provided a confidential message to another user device 210 (e.g., of the set of user devices 210).

In some implementations, the preference information may identify a password associated with the message. The password may include one or more characters (e.g., letters, numbers, symbols, etc.) used to permit access to the message (e.g., the message marked as confidential) by one or more user devices 210. In some implementations, the preference information may identify whether the password is associated with a particular device (e.g., a particular user device 210), a particular user (e.g., of one or more user devices 210), or the like.

In some implementations, the preference information may include information that identifies under what circumstances a particular user device 210 (e.g., of the set of user devices 210) may display the message (e.g., may display message content). For example, the preference information may identify whether the particular user device 210 may display the content based on automatically providing a password, based on providing the password via user input, or the like.

As further shown in FIG. 4A, process 400 may include designating the message as confidential based on the preference information (block 430). For example, first user device 210-1 may designate the message as confidential based on receiving an indication (e.g., via user input from a user of first user device 210-1) that the message is to be confidential.

In some implementations, first user device 210-1 may designate the message as confidential by modifying supplemental information associated with the message. For example, first user device 210-1 may modify (e.g., add, remove, change, etc.) information associated with a tag (e.g., a meta tag) associated with the message, an element (e.g., a meta element) associated with the message, a header associated with the message, an identifier associated with the message, or the like.

In some implementations, first user device 210-1 may modify the supplemental information so as to indicate (e.g., to other user devices 210, to messaging server device 230, etc.) that the message is confidential. In some implementations, first user device 210-1 may modify the supplemental information so as to indicate which one or more user devices 210 (e.g., of the set of user devices 210 associated with the group chat) may receive the message. Additionally, or alternatively, first user device 210-1 may modify the supplemental information so as to indicate which one or more user devices 210 may display the message (e.g., based on providing a password), may display a blocked message, may display a notification that a confidential message has been provided, or the like.

In some implementations, first user device 210-1 may modify the supplemental information so as to identify a password associated with the message (e.g., a password that may permit another user device 210 to display the message). For example, first user device 210-1 may modify the supplemental information to identify that a particular password, associated with a particular user device 210, may be used to display the message. Additionally, or alternatively, first user device 210-1 may modify the supplemental information to identify that the particular password, associated with a particular user of user device 210, may be used to display the message.

In some implementations, first user device 210-1 may designate the message as confidential based on encryption. For example, first user device 210-1 may encrypt the message by use of a cipher (e.g., an algorithm), in such a manner as to permit the message to be decrypted (e.g., by a second user device 210-2) by use of an encryption key.

In some implementations, first user device 210-1 may designate the message as confidential based on receiving a confidential message (e.g., from one of the set of user devices 210). For example, first user device 210-1 may receive a previous message from a second user device 210-2 of the set of user devices 210. First user device 210-1 may determine that the previous message is confidential, and may designate the message (e.g., a reply to the previous message) as confidential based on determining that the previous message is confidential.

As further shown in FIG. 4A, process 400 may include transmitting the message, with the confidential designation, to a user device associated with the group chat (block 440). For example, first user device 210-1 may provide the message (e.g., the message that has been designated as confidential) to one or more other user devices 210 associated with the group chat.

In some implementations, first user device 210-1 may provide the message to a remaining set of user devices 210. In some implementations, first user device 210-1 may provide the message only to those user devices 210 that are authorized to display the message (e.g., as indicated by the preference information and/or the supplemental information).

In some implementations, first user device 210-1 may provide the message, with the confidential designation, to messaging server device 230, and messaging server device 230 may provide the message to the one or more other user devices 210 associated with the group chat.

In some implementations, messaging server device 230 may provide the message based on the preference information (e.g., as identified by the supplemental information associated with the message). For example, based on the supplemental information (e.g., a tag, an element, a header, etc.) associated with the message, messaging server device 210 may identify which one or more user devices 210 is authorized to display the message, and may provide the message to those one or more user devices 210. In some implementations, messaging server device 230 may provide the message only to the one or more user devices 210 authorized to display the message. In some implementations, messaging server device 210 may provide the message to all user devices 210 associated with the group chat regardless of which user devices 210 are authorized to display the message.

In some implementations, based on determining that the message is confidential, messaging server device 230 may generate a blocked version of the message (e.g., a version of the message that is blurred, obstructed, dimmed, etc.), and may provide the blocked version of the message to one or more user devices 210 (e.g., those user devices 210, of the set of user devices 210 associated with the group chat, that are not authorized to display the message). Additionally, or alternatively, messaging server device 230 may generate a notification indicating that first user device 210-1 has provided a confidential message, and may provide the notification, rather than or in addition to the blocked version of the message, to the one or more user devices 210 that are not authorized to display the message.

In some implementations, messaging server device 230 may generate a password associated with the message (e.g., a password to permit a receiving user device 210 to display the message) rather than obtaining the password from first user device 210-1. For example, messaging server device 210 may generate the password based on preference information (e.g., provided by a user of first user device 210-1), information associated with a recipient of the message (e.g., a username, a login password, an identifier, etc.), or the like.

In some implementations, messaging server device 230 may provide the password to one or more user devices 210 (e.g., the one or more user devices 210 authorized to display the message), and the one or more user devices 210 may use the password to obtain acces to the message. Additionally, or alternatively, messaging server device 230 may provide the password to one or more users (e.g., of the one or more user devices 210 authorized to display the message) by providing a separate message outside of the group chat (e.g., via an SMS text message, an email, a voice call, etc.), and the one or more user devices 210 may use the passwords to display the message.

As shown in FIG. 4B, process 450 may include receiving a message with a confidentiality designation (block 460). For example, a second user device 210-2 may receive the message provided by first user device 210-1 (e.g., in process 400 of FIG. 4A). In some implementations, second user device 210-2 may receive the message via messaging server device 230, as described above.

In some implementations, second user device 210-2 may determine that the message is confidential based on supplemental information associated with the message. For example, second user device 210-2 may determine that the message is confidential based on a tag associated with the message, an element associated with the message, a header associated with the message, an identifier associated with the message, or the like. Additionally, or alternatively, second user device 210-2 may determine how the message is to be displayed.

In some implementations, based on determining that the message is confidential, second user device 210-2 may generate a blocked version of the message. For example, second user device 210-2 may display the blocked version of the message along with other messages associated with the group chat. Additionally, or alternatively, second user device 210-2 may receive a blocked version of the message from first user device 210-1 and/or messaging server device 230 (e.g., generated by first user device 210-1 and/or messaging server device 230), and may display the blocked version of the message.

As further shown in FIG. 4B, process 400 may include determining that the message may be displayed (block 470). In some implementations, second user device 210-2 may determine that the message may be displayed based on supplemental information (e.g., a tag, an element, a header, etc.) associated with the message. For example, the supplemental information may identify second user device 210-2 as one of the set of user devices 210 (e.g., associated with the group chat) authorized to display the message. Based on the supplemental information (e.g., based on determining that second user device 210-2 is authorized to display the message), second user device 210-2 may determine that the message may be displayed (e.g., on a user interface associated with second user device 210-2).

In some implementations, second user device 210-2 may determine that the message is to be displayed based on receiving the message. For example, first user device 210-1 and/or messaging server device 230 may provide the message to second user device 210-2 based on determining that second user device 210-2 is one of the user devices 210 authorized to display the message. Second user device 210-2 may determine that the message is to be displayed based on merely receiving the message.

In some implementations, second user device 210-2 may determine that the message may be displayed based on receiving a password. For example, second user device 210-2 may display a blocked version of the message, and may display a field (e.g., a data entry field, a text box, etc.) indicating that a password is needed to display the message. A user of second user device 210-2 may provide the password via user input, and second user device 210-2 may determine that the message may be displayed based on the received password matching a password previously associated with the message.

In some implementations, the password may include a password received from first user device 210-1 and/or messaging server device 230 (e.g., generated by first user device 210-1 and/or messaging server device 230, and provided to the user of second user device 210-2 via an email, an SMS text message, a voice call, etc.). Additionally, or alternatively, the password may include a password received from a user of first user device 210-1 (e.g., via a previous communication). In some implementations, the password may include a password associated with a user account (e.g., associated with the user of second user device 210-2). For example, the user of second user device 210-2 may participate in the group chat by use of a subscription service (e.g., a telecommunications service, an instant messaging service, an email service, etc.), and the password may include a password associated with the subscription service (e.g., a username, a login password, etc.).

In some implementations, second user device 210-2 may obtain the message based on receiving the password. For example, based on receiving a blocked version of the message (e.g., from messaging server device 230), second user device 210-2 may provide a notification (e.g., to the user of second user device 210-2) that a password is needed to view the message (e.g., the password generated by messaging server device 230 and provided to the user of second user device 210-2 via email, SMS text message, a voice call, etc.). Based on receiving the password, second user device 210-2 may obtain the message (e.g., the unblocked message) from messaging server device 230.

In some implementations, second user device 210-2 may determine that the message may not be displayed. For example, second user device 210-2 may determine (e.g., based on the supplemental information) that second user device 210-2 and/or a user of second user device 210-2 is not authorized to display and/or view the message. Additionally, or alternatively, second user device 210-2 may determine that the password (e.g., provided by the user of second user device 210-2) is not correct. In some implementations, based on determining that the message may not be displayed, second user device 210-2 may display a blocked message (e.g., a version of the message that is blurred, obstructed, dimmed, etc.). Additionally, or alternatively, second user device 210-2 may display a notification indicating that the message may not be displayed.

As further shown in FIG. 4B, process 400 may include displaying the message (block 480). For example, second user device 210-2 may display the message on a display associated with second user device 210-2 (e.g., a monitor, a display, a touchscreen, etc.) based on determining that the message may be displayed (e.g., based on determining that second user device 210-2 is authorized to display the message, based on receiving a password, etc.).

In some implementations, second user device 210-2 may display the message by unblocking the message (e.g., by removing blur associated with the message, by removing an obstruction from the message, etc.) so as to reveal the contents of the message.

Although FIGS. 4A-4B show example blocks of processes 400 and 450, in some implementations, processes 400 and 450 may include additional blocks, fewer blocks, different blocks, and/or differently arranged blocks than those depicted in FIGS. 4A-4B. Additionally, or alternatively, two or more of the blocks of processes 400 and 450 may be performed in parallel.

FIGS. 5A-5D are diagrams of an example implementation 500 relating to processes 400 and 450 (FIGS. 4A-4B). In example implementation 500, a set of user devices 210 may participate in a group chat. One of the user devices 210, of the set of user devices 210, may share a confidential message, which may be displayed upon receipt of a password.

Figure 5A:
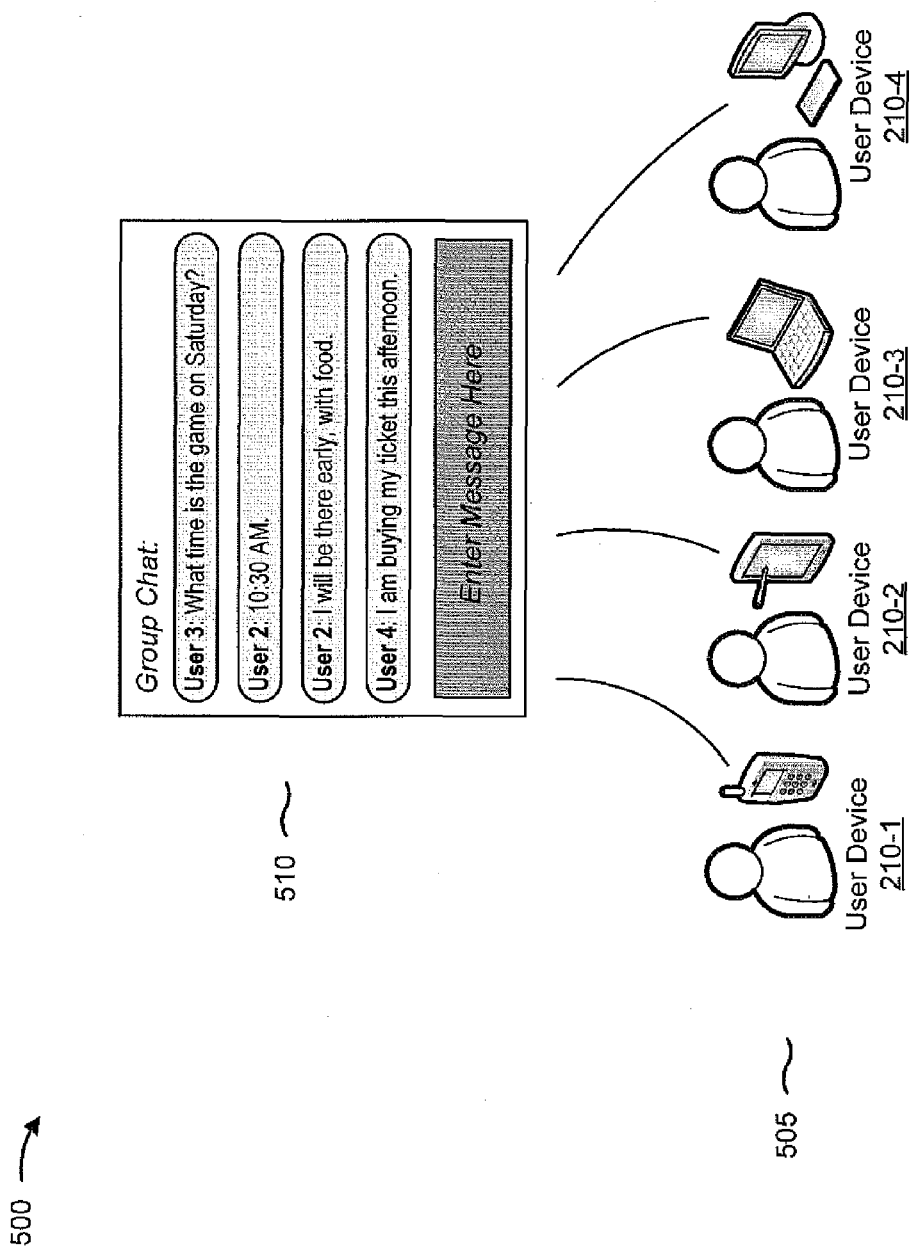
FIGS. 5A-5D are diagrams of an example implementation relating to the example process shown in FIGS. 4A-4B.

As shown in FIG. 5A, and by reference number 505, the set of user devices 210 may include a first user device 210-1, a second user device 210-2, a third user device 210-3, and a fourth user device 210-4. The set of user devices 210 may participate in a group chat (e.g., associated with attending an upcoming sporting event). As shown by reference number 510, each user device 210, of the set of user devices 210, may display messages shared by other user devices 210 (e.g., by use of an instant messaging application associated with the set of user devices 210). The messages already shared as part of the group chat may include a message from third user device 210-3 (e.g., "What time is the game on Saturday?"), two messages from second user device 210-2 (e.g., "10:30 AM," and "I will be there early, with food."), and a message from fourth user device 210-4 (e.g., "I am buying my ticket this afternoon.").

Figure 5B:
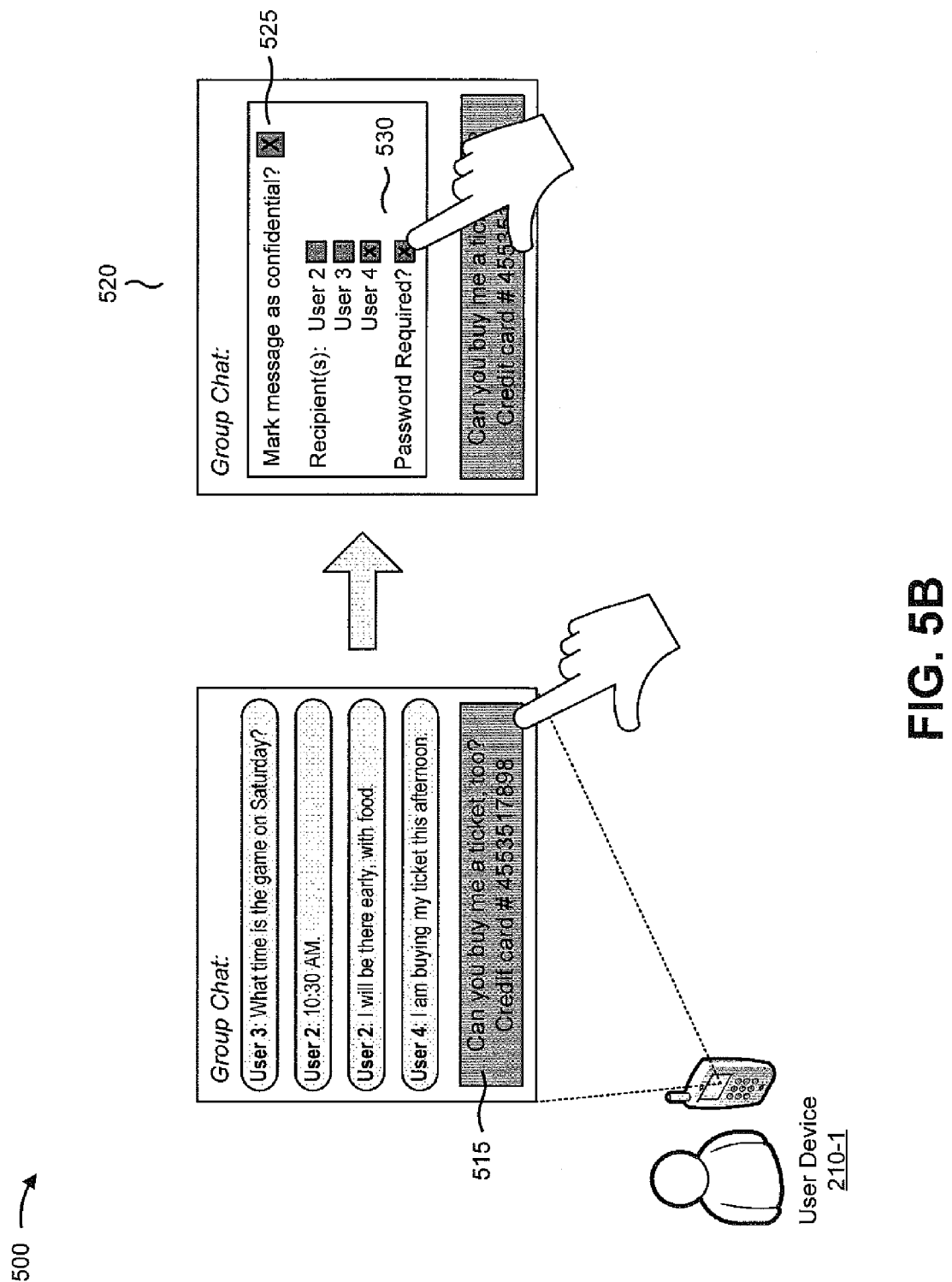

As shown in FIG. 5B, and by reference number 515, first user device 210-1 may receive a message (e.g., "Can you buy my ticket, too? Credit card #4559517898") via user input from a user of first user device 210-1. As shown by reference number 520, first user device 210-1 may display options for sending the message. As shown by reference number 525, first user device 210-1 may receive preference information (e.g., via user input from the user of first user device 210-1) that indicates that the message is to be designated as confidential. As shown by reference number 530, first user device 210-1 may also receive preference information indicating that fourth user device 210-4 is to receive the message, and that a password is to be required to display the message. Based on the preference information, first user device 210-1 may designate the message as confidential (e.g., by associating the message with one or more meta tags that indicate that the message is confidential, that the message is to be sent to fourth user device 210-4, and that a password is required to view the message).

Figure 5C:
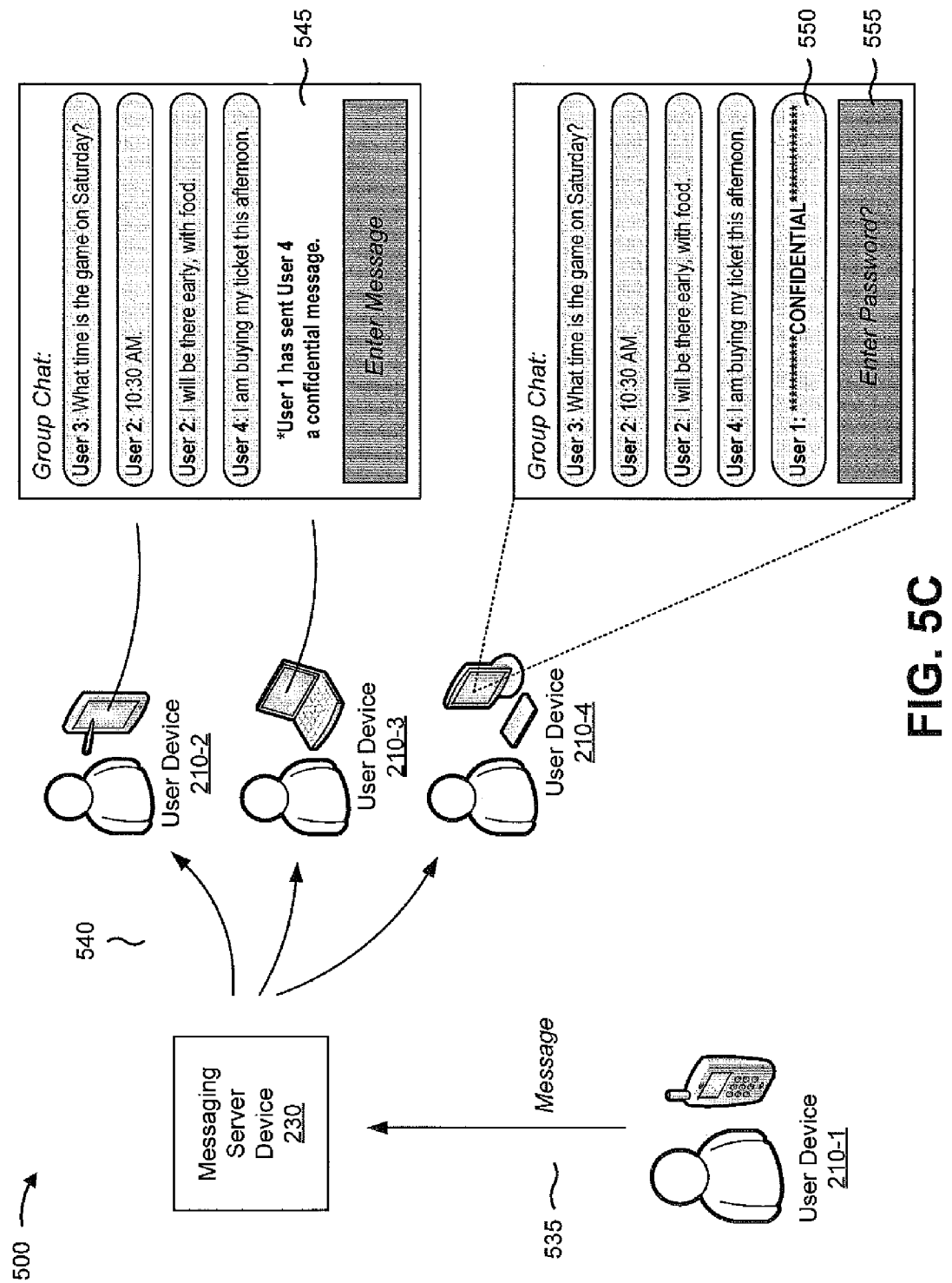

As shown in FIG. 5C, and by reference number 535, first user device 210-1 may provide the message to messaging server device 230. As shown by reference number 540, based on the one or more meta tags associated with the message (e.g., based on the preference information associated with the message), messaging server device 230 may generate a blocked version of the message, and may provide the blocked version of the message to fourth user device 210-4. Messaging server device 230 may also provide a notification to second user device 210-2 and third user device 210-3 (e.g., indicating that first user device 210-1 has shared a confidential message with fourth user device 210-4).

As shown by reference number 545, second user device 210-2 and third user device 210-3 may display the notification (e.g., "User 1 has sent User 4 a confidential message"). As shown by reference number 550, fourth user device 210-4 may display the blocked version of the message. As shown by reference number 555, fourth user device 210-4 may display an option to enter a password (e.g., in order to view the message).

Figure 5D:
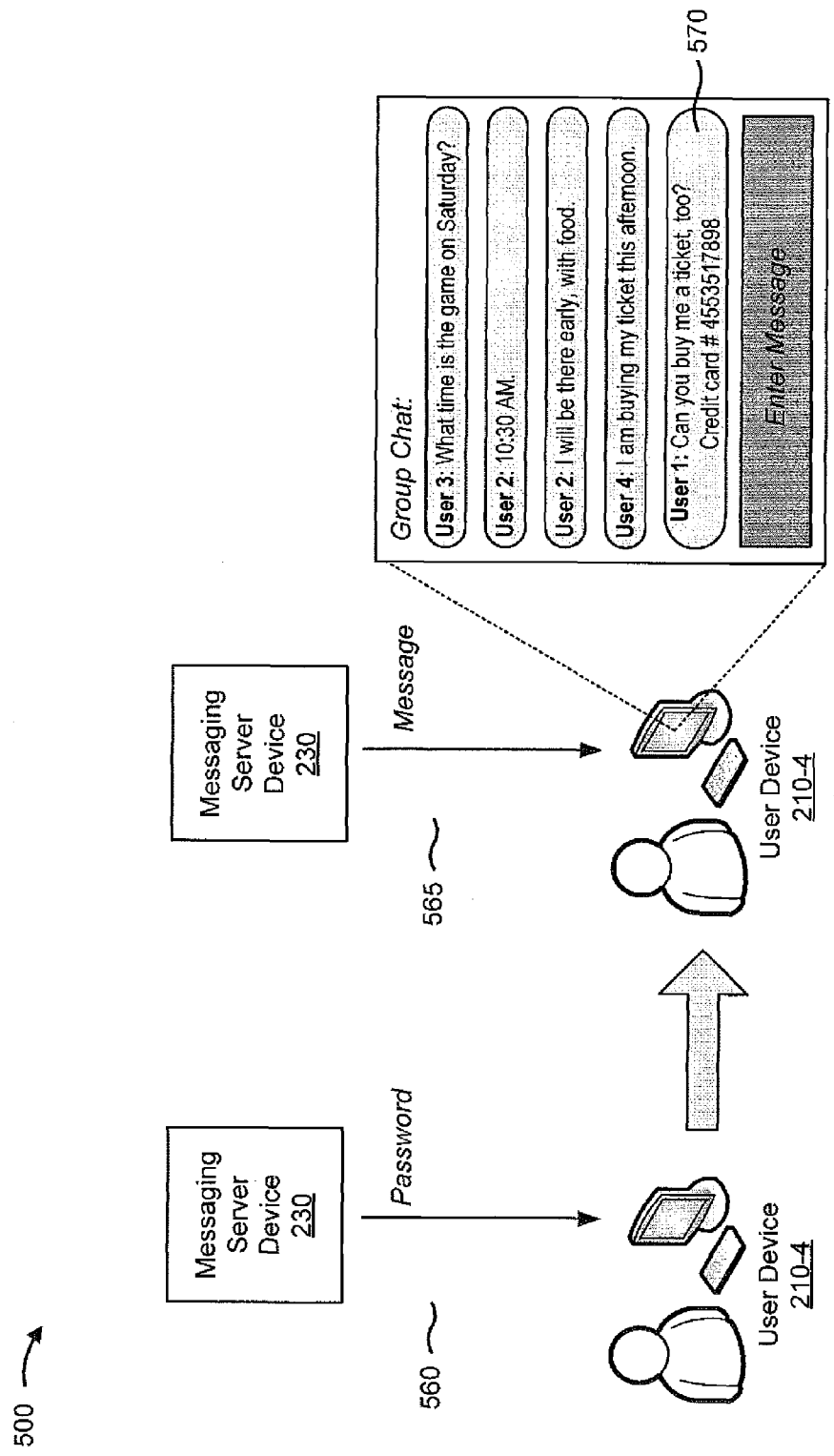

As shown in FIG. 5D, and by reference number 560, messaging server device 230 may generate a password, and may provide the password to a user of fourth user device 210-4 via email (e.g., by emailing the password to an email account associated with the user of fourth user device 210-4). As shown by reference number 565, the user of fourth user device 210-4 may enter the password (e.g., via user input), and based on receiving the password (e.g., which matches the password generated by messaging server device 230), fourth user device 210-4 may query messaging server device 230 to receive the message. As shown by reference number 570, fourth user device 210-4 may display the message along with other messages associated with the group chat. In this manner, first user device 210-1 may share sensitive information (e.g., a credit card number) with fourth user device 210-4 without sharing sensitive information with other user devices 210 associated with the group chat (e.g., without sharing the sensitive information with second user device 210-2 and third user device 210-3).

As indicated above, FIGS. 5A-5D are provided merely as an example. Other examples are possible and may differ from what was described with regard to FIGS. 5A-5D.

Figure 6A:
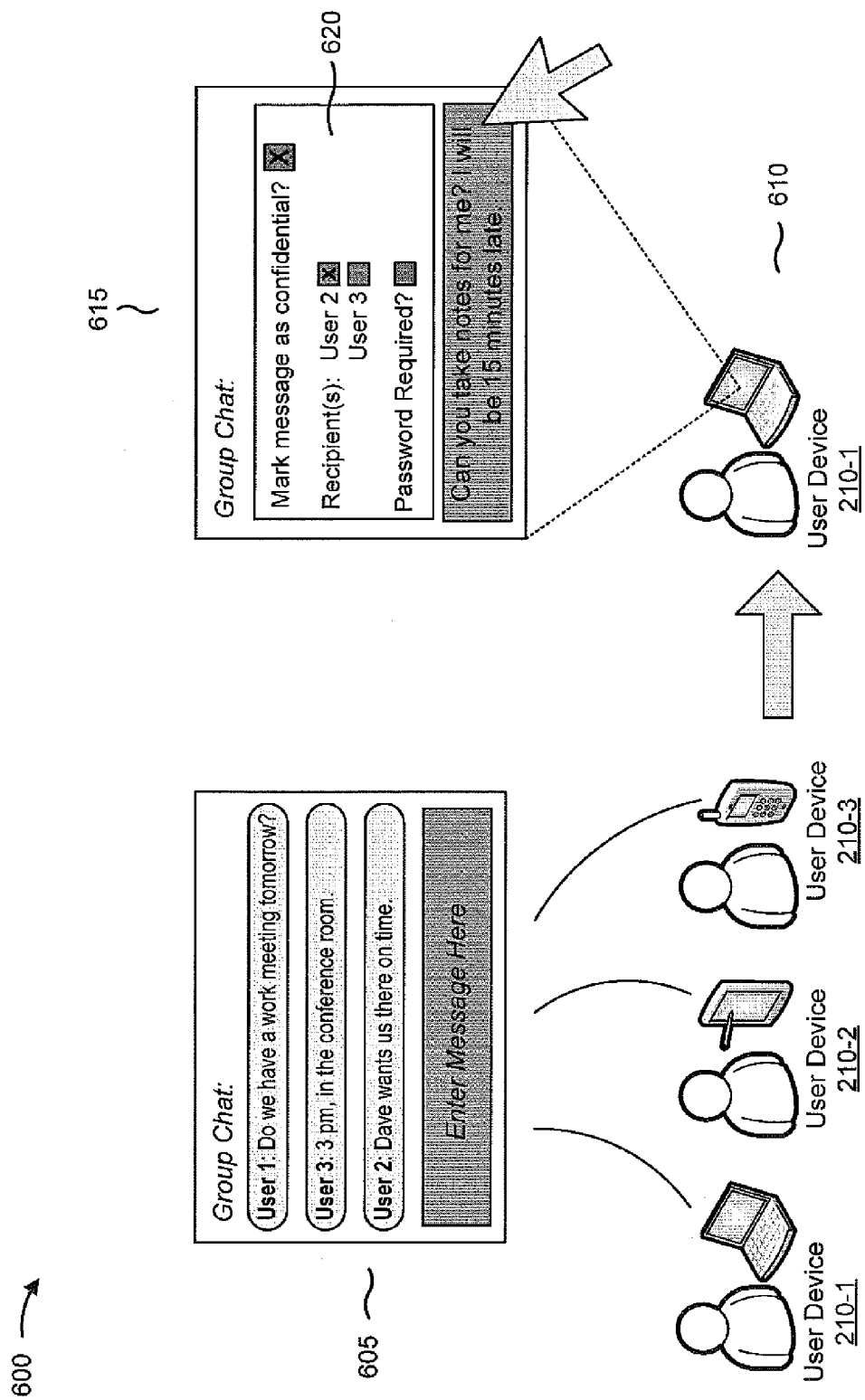
FIGS. 6A-6B are diagrams of another example implementation relating to the example process shown in FIGS. 4A-4B.
Figure 6B:
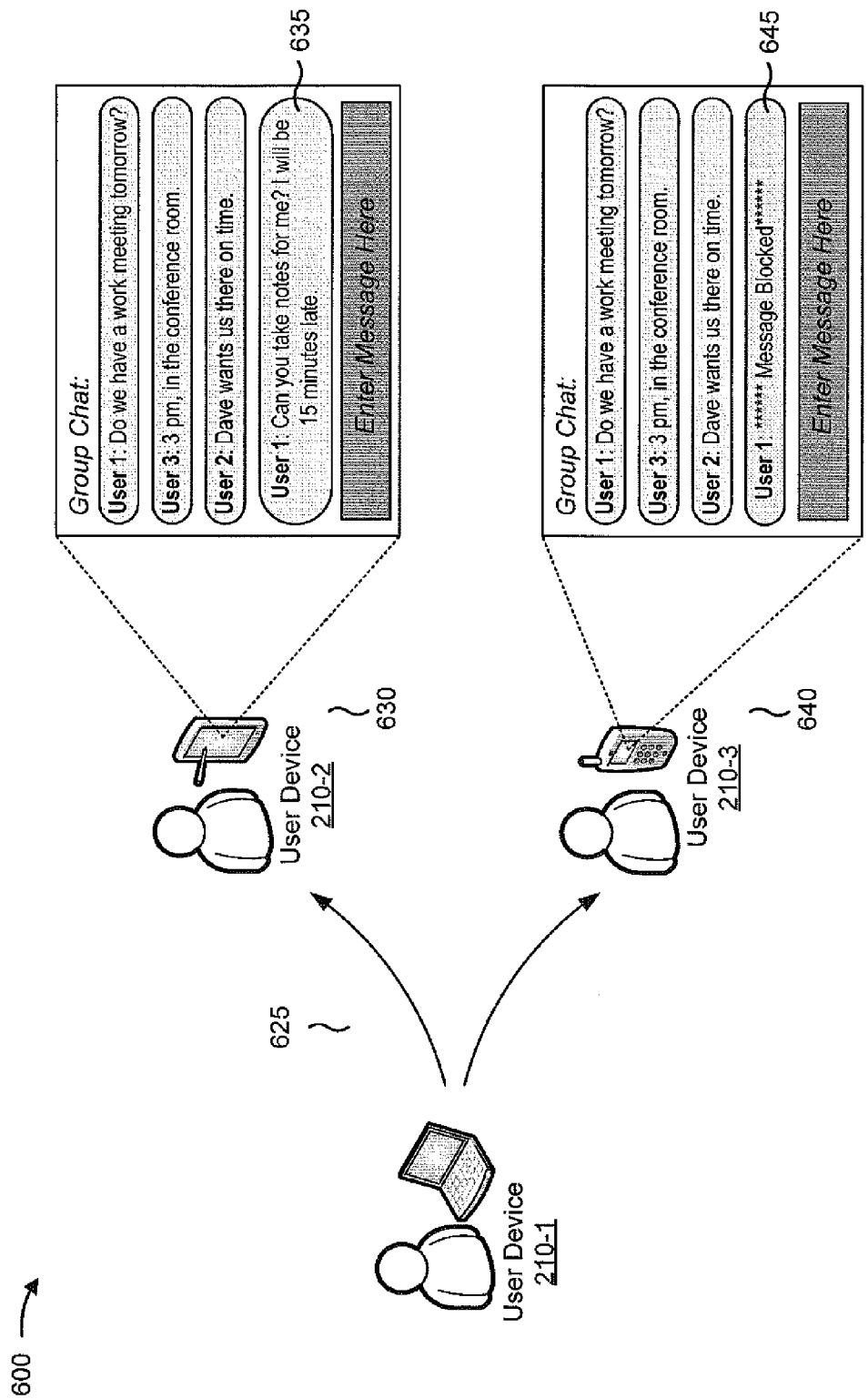

FIGS. 6A-6B are diagrams of another example implementation 600 relating to processes 400 and 450 (FIGS. 4A-4B). In example implementation 600, a set of user devices 210 (e.g., a first user device 210-1, a second user device 210-2, and a third user device 210-3) may participate in a group chat. One of the user devices 210, of the set of user devices 210, may share a confidential message, which may be displayed automatically (e.g., without the use of a password).

As shown in FIG. 6A, and by reference number 605, the group chat may include a message associated with first user device 210-1 (e.g., "Do we have a work meeting tomorrow?"), a message associated with third user device 210-3 (e.g., "3 pm, in the conference room."), and a message associated with second user device 210-2 (e.g., "Dave wants us there on time.").

As shown by reference number 610, a user of first user device 210-1 may provide a message (e.g., "Can you take notes for me? I will be 15 minutes late."), via user input, to first user device 210-1. As shown by reference number 615, first user device 210-1 may display options for sending the message. As shown by reference number 620, first user device 210-1 may receive preference information (e.g., via user input from the user of first user device 210-1) that indicates that the message is to be designated as confidential, and that second user device 210-2 is authorized to display the message. Based on the preference information, first user device 210-1 may designate the message as confidential (e.g., by associating the message with one or more meta tags that indicate that the message is confidential, and that second user device 210-2 is authorized to display the message).

As shown in FIG. 6B, and by reference number 625, first user device 210-1 may provide the message (and associated meta tags) to second user device 210-2 and third user device 210-3. As shown by reference number 630, second user device 210-2 may determine that the message is confidential and that second user device 210-2 is authorized to display the message (e.g., based on the meta tags). As shown by reference number 635, based on determining that second user device 210-2 is authorized to display the message, second user device 210-2 may display the message.

As shown by reference number 640, third user device 210-3 may determine that the message is confidential and that third user device 210-3 is not authorized to display the message (e.g., based on the meta tags). Based on determining that third user device 210-3 is not authorized to display the message, third user device 210-3 may generate a blocked version of the message (e.g., "\*\*\*\*\*\*Message Blocked\*\*\*\*\*\*"), and may display the blocked version of the message, as shown by reference number 645. In this manner, first user device 210-1 may provide a confidential message to second user device 210-2 without a user of third user device 210-3 being able to view the message.

As indicated above, FIGS. 6A-6B are provided merely as an example. Other examples are possible and may differ from what was described with regard to FIGS. 6A-6B.

Implementations described herein may allow a first user device (e.g., associated with a group chat) to share a confidential message that may be displayed by only those other user devices (e.g., associated with the group chat) identified by a user of the first user device.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein. In some implementations, the user interfaces may be customizable by a device or a user. Additionally, or alternatively, the user interfaces may be pre-configured to a standard configuration, a specific configuration based on capabilities and/or specifications associated with a device on which the user interfaces are displayed, or a set of configurations based on capabilities and/or specifications associated with a device on which the user interfaces are displayed.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A server device, comprising:
   one or more processors to:
   receive a message associated with a group chat,
     the group chat including a communication session among a plurality of user devices, the plurality of user devices including a first user device associated with a first user of the group chat, a second user device associated with a second user of the group chat, and a third user device associated with a third user of the group chat,
     the message being received from the third user device;
   receive an indication that the message is confidential;
   designate the message as a confidential message based on receiving the indication;
   determine, based on the indication, that the first user device is to be provided a blocked version of the confidential message and that the first user device is authorized to display a content of the confidential message, if the first user device provides a first password;
   determine that the second user device is not authorized to display the confidential message based on the indication;
   generate the first password based on information associated with the first user device and based on a determination that the first user device is to be provided a blocked version of the confidential message;
   associate the confidential message with the first password;
   generate the blocked version of the confidential message based on
   at least one of blurring or dimming a content of the confidential message,
     the at least one of the blurring or the dimming being removable by the first user device;
   provide the blocked version of the confidential message to the first user device for display in the group chat;
   provide the first password to the first user device via a separate message outside of the group chat;
   cause the first user device to prompt, via the group chat, the first user to enter a second password based on providing the blocked version of the confidential message;
   receive preference information, input by the third user of the group chat and for the message, indicating whether the second user device is to be provided a notification that the confidential message has been provided to the group chat;
   selectively generate the notification that the confidential message has been provided to the group chat based on whether the preference information indicates the second user device is to be provided the notification that the confidential message has been provided to the group chat,
     the notification being generated if the preference information, for the message, indicates the second user device is to be provided the notification and based on information identifying the third user of the group chat, associated with the third user device that sent the confidential message, and information identifying the first user of the group chat to which the confidential message is sent,
     the notification being another message associated with the group chat and being different than the blocked version of the confidential message;
   provide the notification, generated by the server device, to the second user device for display as part of the group chat if the preference information, for the message, indicates the second user device is to be provided the notification,
     the notification being provided to the second user device without sharing a content of the confidential message with the second user device in the notification,
   receive the second password from the first user device based on the first user device being caused to prompt the first user to enter the second password;
   determine that the second password matches the first password; and
   cause the content of the confidential message to be displayed by the first user device as part of the group chat,
     the content of the confidential message being caused to be displayed based on determining that the second password matches the first password,
     the confidential message being caused to be displayed by removing the at least one of the blurring or the dimming.

2. The server device of claim 1, where the one or more processors, when designating the message as the confidential message, are to:
   associate the message with a tag that identifies the message as a confidential message.

3. The server device of claim 1, where the one or more processors, when receiving the message, are to:
   receive the message based on user input via the third user device of the plurality of user devices.

4. The server device of claim 1,
   where the one or more processors are further to:
   encrypt the message; and
   provide, based on receiving the second password, the confidential message to the first user device to cause the first user device to display the message based on decrypting the confidential message.

5. The server device of claim 1, where the confidential message is a reply to a previous message associated with the first user device,
   the previous message being confidential; and
   where the one or more processors, when designating the message as the confidential message, are to:
   designate the message as the confidential message based on determining that the confidential message is a reply to the previous message.

6. A non-transitory computer-readable medium storing instructions, the instructions comprising:
   one or more instructions that, when executed by one or more processors, cause the one or more processors to:
   receive a message associated with a group chat, the group chat including a communication session among a plurality of user devices including a first user device associated with a first user of the group chat, a second user device associated with a second user of the group chat, and a third user device associated with a third user of the group chat, the message being received from the third user device;

receive an indication that the message is a confidential message, designate the message as the confidential message based on the indication;

determine, based on the indication, that the first user device is to be provided a blocked version of the confidential message and that the first user device is permitted to display a content of the confidential message based on the first user device providing a first password, determine, based on the indication, that the second user device is not permitted to display the confidential message;

generate the first password based on information associated with the first user device and based on determining that the first user device is to be provided the blocked version of the confidential message;

associate the confidential message with the first password;

generate the blocked version of the confidential message based on at least one of blurring, or dimming a content of the confidential message,
the at least one of the blurring or the dimming being removable by the first user device;

provide the blocked version of the confidential message to the first user device for display in the group chat;

provide the first password to the first user device via a separate message outside of the group chat;

cause the first user device to prompt, via the group chat, the first user to enter a second password based on providing the blocked version of the confidential message;

receive preference information, input by the third user of the group chat and for the message, indicating whether the second user device is to be provided a notification that the confidential message has been provided to the group chat;

selectively generate the notification that the confidential message has been provided to the group chat based on whether the preference information indicates the second user device is to be provided the notification that the confidential message has been provided to the group chat, the notification being generated if the preference information, for the message, indicates the second user device is to be provided the notification and based on information identifying the third user of the group chat that sent the confidential message and information identifying the first user of the group chat to which the confidential message is sent,
the notification being another message associated with the group chat and being different than the blocked version of the confidential message;

provide the notification to the second user device for display as part of the group chat if the preference information, for the message, indicates the second user device is to be provided the notification,
the notification being provided to the second user device without sharing the content of the confidential message with the second user device in the notification;

receive the second password from the first user device based on causing the first user device to prompt the first user to enter the second password;

determine that the second password matches the first password; and cause the content of the confidential message to be displayed by the first user device as part of the group chat,
the content of the confidential message being caused to be displayed based on determining that the second password matches the first password,
the confidential message being caused to be displayed by removing the at least one the blurring or the dimming.

7. The non-transitory computer-readable medium of claim 6, where the one or more instructions, that cause the one or more processors to designate the message as the confidential message, cause the one or more processors to:
associate the message with at least one of:
a tag that identifies that the message is a confidential message;
an element that identifies that the message is a confidential message;
a header that identifies that the message is a confidential message; or
an identifier that identifies that the message is a confidential message;
where the one or more instructions, that cause the one or more processors to provide the content of the confidential message to the first user device, cause the one or more processors to:
provide the content of the confidential message to the first user device based on at least one of:
the tag;
the element;
the header; or
the identifier.

8. The non-transitory computer-readable medium of claim 6, where the one or more instructions, that cause the one or more processors to receive the second password, cause the one or more processors to:
receive the second password based on user input by the first user of the first user device.

9. A method, comprising:
receiving, by a server device, a message associated with a group chat,
the group chat including a communication session among a plurality of user devices including a first user device associated with a first user of the group chat, a second user device associated with a second user of the group chat, and a third user device associated with a third user of the group chat,
the message being received from the third user device;
receiving, by the server device, an indication that the message is confidential;
designating, by the server device, the message as a confidential message based on receiving the indication;
determining, by the server device and based on a user input, that the first user device is to be provided a blocked version of the confidential message and that the first user device is permitted to display a content of the confidential message based on the first user device providing a first password, determining, by the server device and based on the user input, that the second user device is not permitted to display the confidential message;

generating, by the server device, the first password based on information associated with the first user device and based on determining that the first user device is to be provided the blocked version of the confidential message;

associating, by the server device, the confidential message with the first password;

generating, by the server device, the blocked version of the confidential message based on at least one of blurring or dimming the content of the confidential message, the at least one of the blurring or the dimming being removable by the first user device;

providing, by the server device, the blocked version of the confidential message to the first user device for display in the group chat;

providing, by the server device, the first password to the first user device via a separate message outside of the group chat;

causing, by the server device, the first user device to prompt, via the group chat, the first user to enter a second password based on providing the blocked version of the confidential message;

receiving, by the server device, preference information, input by the third user of the group chat and for the message, indicating whether the second user device is to be provided a notification that the confidential message has been provided to the group chat;

selectively generating, by the server device, the notification that the confidential message has been provided to the group chat based on whether the preference information indicates the second user device is to be provided the notification that the confidential message has been provided to the group chat, the notification being generated if the preference information, for the message, indicates the second user device is to be provided the notification and based on information identifying the third user of the group chat that sent the confidential message and information identifying the first user of the group chat to which the confidential message is sent, the notification being another message associated with the group chat and being different than the blocked version of the confidential message;

providing, by the server device, the notification to the second user device for display in the group chat if the preference information, for the message, indicates the second user device is to be provided the notification, the notification being provided to the second user device without sharing the content of the message with the second user device in the notification;

receiving, by the server device, the second password from the first user device based on causing the first user device to prompt the first user to enter the second password;

determining, by the server device, that the second password matches the first password; and causing, by the server device, the confidential message to be displayed by the first user device as part of the group chat, the confidential message being caused to be displayed based on determining that the second password matches the first password, the confidential message being caused to be displayed by removing the at least one of the blurring or the dimming.

10. The method of claim 9, where providing the notification comprises:

providing information that identifies the third user that sent the confidential message and the first user to which the confidential message is sent.

11. The method of claim 9, where the message is associated with supplemental information;

where designating the message as the confidential message comprises:

modifying the supplemental information to designate the message as the confidential message; and where providing the blocked version of the confidential message comprises:

providing the blocked version of the confidential message based on the modified supplemental information.

12. The server device of claim 1, where the blocked version of the confidential message includes an encrypted version of the content of the confidential message that may be decrypted by the first user device to display the content of the confidential message.

13. The server device of claim 1, where the one or more processors are further to:

send the content of the confidential message to the first user device after the blocked version of the confidential message is sent to the first user device.

14. The method of claim 9, further comprising:

providing the first password to the first user device based on a user input that the first user device or the first user of the group chat is authorized to receive the confidential message.

15. The non-transitory computer-readable medium of claim 6, where the confidential message is a reply to a previous message associated with the first user device, the previous message being confidential; and where the one or more instructions, when designating the message as the confidential message, further cause the one or more processors to:

designate the message as the confidential message based on determining that the confidential message is a reply to the previous message.

16. The server device of claim 1, where the one or more processors, when designating the message as the confidential message, are to:

associate the message with an element that identifies that the message is a confidential message.

17. The server device of claim 1, where the one or more processors, when designating the message as the confidential message, are to:

associate the message with a header that identifies that the message is a confidential message; or associate the message with an identifier that identifies that the message is a confidential message.

18. The server device of claim 1, where the separate message outside of the group chat includes at least one of:

an email, a text message, or a voice call.

19. The non-transitory computer-readable medium of claim 6, where the separate message outside of the group chat includes at least one of:

an email,
a text message, or
a voice call.

20. The method of claim 9, where the separate message outside of the group chat includes at least one of:
an email,
a text message, or
a voice call.

* * * * *